(12) United States Patent
Teran et al.

(10) Patent No.: US 11,189,852 B2
(45) Date of Patent: Nov. 30, 2021

(54) POLYMER-BASED ELECTROLYTE MATERIALS FOR PROTON EXCHANGE MEMBRANE FUEL CELLS

(71) Applicant: Robert Bosch GmbH, Stuttgart (DE)

(72) Inventors: Natasha Teran, Foster City, CA (US); Malar Azagarsamy, Fremont, CA (US); Hany Eitouni, Oakland, CA (US)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 16/554,098

(22) Filed: Aug. 28, 2019

(65) Prior Publication Data

US 2021/0066740 A1 Mar. 4, 2021

(51) Int. Cl.
*H01M 8/10* (2016.01)
*C08G 63/16* (2006.01)
*C08L 53/00* (2006.01)
*C08L 67/02* (2006.01)
*H01M 8/1025* (2016.01)
*H01M 8/1027* (2016.01)
*H01M 8/1032* (2016.01)
*H01M 8/1018* (2016.01)

(52) U.S. Cl.
CPC .......... *H01M 8/1025* (2013.01); *C08G 63/16* (2013.01); *C08L 53/00* (2013.01); *C08L 67/02* (2013.01); *H01M 8/1027* (2013.01); *H01M 8/1032* (2013.01); *C08L 2203/20* (2013.01); *H01M 2008/1095* (2013.01); *H01M 2300/0082* (2013.01)

(58) Field of Classification Search
CPC ............ H01M 8/1025; H01M 8/1027; H01M 8/1032; H01M 2300/0082; H01M 2008/1095; C08G 63/16; C08L 53/00; C08L 67/02; C08L 2203/20
USPC .......................................................... 521/27
See application file for complete search history.

(56) References Cited

U.S. PATENT DOCUMENTS

| 7,955,665 B2 * | 6/2011 | Nishiyama | C09D 4/00 428/1.2 |
| 10,023,697 B2 * | 7/2018 | Breyta | A01N 43/58 |
| 10,490,850 B2 * | 11/2019 | Azagarsamy | C08G 2/00 |
| 2017/0073471 A1 * | 3/2017 | Breyta | D21H 17/55 |
| 2019/0319307 A1 * | 10/2019 | Azagarsamy | H01M 10/0565 |

\* cited by examiner

*Primary Examiner* — Michael M. Bernshteyn
(74) *Attorney, Agent, or Firm* — Brooks Kushman P.C.

(57) ABSTRACT

Polymer-based electrolyte materials that may be used as proton exchange membranes in proton exchange membrane fuel cells are described. The disclosed polymer electrolyte materials can be generally defined by a general 1,3-dicarbonyl repeat unit that may include various side chain and main chain constituents changing the acidity of the C—H proton(s) located between the carbonyl groups. Accordingly, by varying such side-chain and main-chain constituents, the proton-conduction properties the disclosed proton exchange membranes can be manipulated, and methods of producing the same. Methods of producing such polymer electrolyte materials are also disclosed.

20 Claims, 1 Drawing Sheet

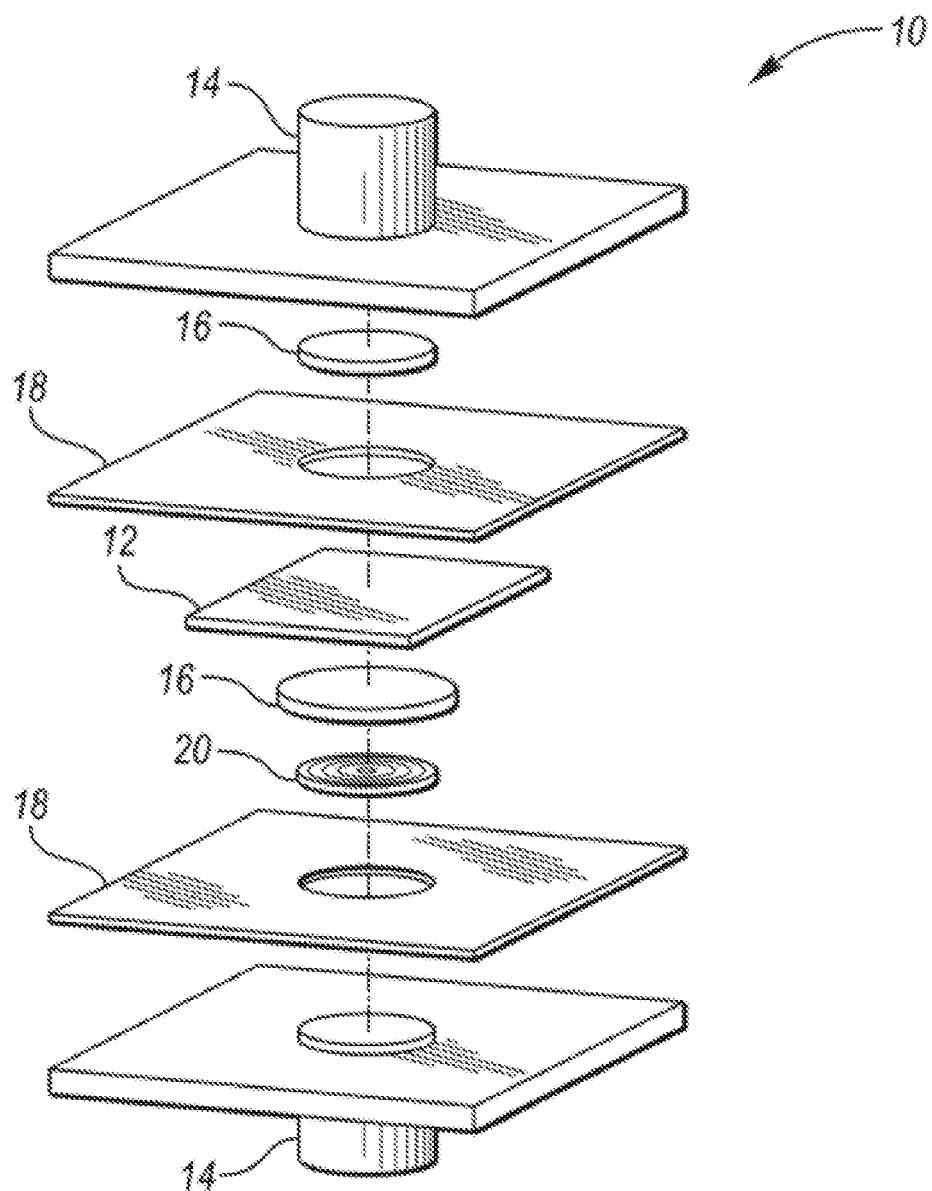

POLYMER-BASED ELECTROLYTE MATERIALS FOR PROTON EXCHANGE MEMBRANE FUEL CELLS

TECHNICAL FIELD

The present disclosure is generally directed to polymer-based electrolyte materials for proton exchange membrane fuel cells. More specifically, the present disclosure relates to polymer electrolytes for proton exchange membranes based on 1,3-ketone functionality and methods of producing the same.

BACKGROUND

Fuel cells and, specifically, proton exchange membrane fuel cells (PEMFCs) hold great promise as high efficiency, high power density, relative light weight, and zero carbon emission energy sources for use in a wide variety of applications. Such applications include, but are not limited to, transportation, stationary power generation, and portable power generation. Particularly relevant to its automotive and other transportation-related applications, the PEMFC represents an environmental-friendly alternative to internal combustion engines for a variety of vehicles.

PEMFCs operate based on the transfer of protons between an anode and a cathode. Key components of PEMFCs include, among others, a proton exchange membrane (PEM) through which protons are transferred and a membrane-electrode assembly (MEA) in which the PEM is included. PEMs may include polymer-based electrolyte materials that exhibit sufficient proton-conduction characteristics and acceptable thermal stability. Nafion, a sulfonated copolymer material based on tetrafluoroethylene, is a material that is commonly employed for use in fuel cell PEMs. Despite its widespread use, Nafion exhibits relatively poor proton conduction, low thermal stability, high gas permeability, high production costs, and poor environmental compatibility. In view of such drawbacks, there remains a need for new polymer electrolyte materials that can be safely and efficiently used in fuel cell PEMs.

SUMMARY

According to at least one embodiment, a polymer electrolyte material with the following structure is disclosed:

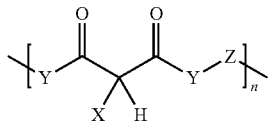

where X is H, an alkyl group, a polar group, a perfluoro group, an olefinic group, or an ether, Y is O, S, $CH_2$, CHF, $CF_2$, or NR, Z is an alkyl chain, perfluoroalkane, or an ether, and n is an integer ranging from 10 to 1000. In accordance with embodiments in which X is an alkyl group, non-limiting examples include a methyl group, an ethyl group, an isopropyl group, a butyl group, and a t-butyl group. In accordance with embodiments in which X is a polar group, non-limiting examples include F, CN, $SO_2$, C(O)Me, C(O)Et, $CO_2Me$, and $CO_2Et$. In accordance with embodiments in which X is a perfluoro group, non-limiting examples include $CF_3$, $CF_2CF_3$, and $CH_2CF_3$. In accordance with embodiments in which X is an olefinic group, non-limiting examples include a vinyl group ($-CH=CH_2$) and an allyl group ($-CH_2CH=CH_2$). In accordance with embodiments in which X is an ether, non-limiting examples include a methoxy group ($-OCH_3$), an ethoxy group ($-OCH_2CH_3$), a propoxy group ($-OCH_2CH_2CH_3$), etc. In certain embodiments, crosslinked and non-crosslinked block copolymer electrolytes containing dicarbonyl polymer electrolyte materials, such as those described by the structure shown above, are disclosed.

In another embodiment, a proton exchange membrane (PEM) for a proton exchange membrane fuel cell (PEMFC) is disclosed. The PEM includes a polymer electrolyte material with the following structure:

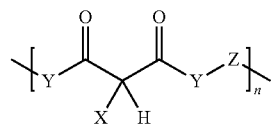

where X is H, alkyl group, a polar group, a perfluoro group, an olefinic group, or an ether, Y is O, S, $CH_2$, CHF, $CF_2$, or NR, Z is an alkyl chain, perfluoroalkane, or an ether, and n is an integer ranging from 10 to 1000. In accordance with embodiments in which X is an alkyl group, non-limiting examples include a methyl group, an ethyl group, an isopropyl group, a butyl group, and a t-butyl group. In accordance with embodiments in which X is a polar group, non-limiting examples include F, CN, $SO_2$, C(O)Me, C(O)Et, $CO_2Me$, and $CO_2Et$. In accordance with embodiments in which X is a perfluoro group, non-limiting examples include $CF_3$, $CF_2CF_3$, and $CH_2CF_3$. In accordance with embodiments in which X is an olefinic group, non-limiting examples include a vinyl group ($-CH=CH_2$) and an allyl group ($-CH_2CH=CH_2$). In accordance with embodiments in which X is an ether, non-limiting examples include a methoxy group ($-OCH_3$), an ethoxy group ($-OCH_2CH_3$), a propoxy group ($-OCH_2CH_2CH_3$), etc.

According to other embodiments, methods of producing a polymer electrolyte materials for use in proton exchange membranes are disclosed. The method involves the polycondensation of a diol with a malonate. In one embodiment, the malonate may be dimethyl malonate. In accordance with at least one embodiment, synthesis of certain dicarbonyl polymer electrolyte materials disclosed herein may be defined as follows:

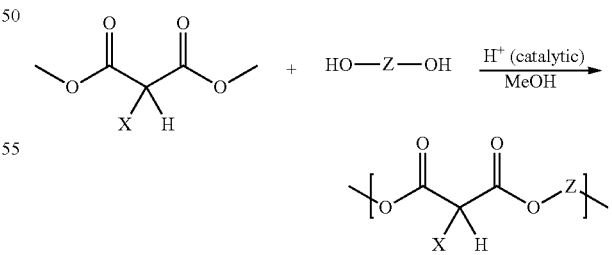

where X is H, an alkyl group, a polar group, a perfluoro group, an olefinic group, or an ether and Z is an alkyl chain, perfluoroalkane, or an ether. In accordance with embodiments in which X is an alkyl group, non-limiting examples include a methyl group, an ethyl group, an isopropyl group, a butyl group, and a t-butyl group. In accordance with embodiments in which X is a polar group, non-limiting examples include F, CN, $SO_2$, C(O)Me, C(O)Et, $CO_2$Me, and $CO_2$Et. In accordance with embodiments in which X is a perfluoro group, non-limiting examples include $CF_3$, $CF_2CF_3$, and $CH_2CF_3$. In accordance with embodiments in which X is an olefinic group, non-limiting examples include a vinyl group (—CH═$CH_2$) and an allyl group (—$CH_2$CH═$CH_2$). In accordance with embodiments in which X is an ether, non-limiting examples include a methoxy group (—$OCH_3$), an ethoxy group (—$OCH_2CH_3$), a propoxy group (—$OCH_2CH_2CH_3$), etc.

The size and nature of the diol can be varied to control the physical, thermal, and mechanical properties of the resulting polymer electrolyte. The incorporation of a bulky diol such as an adamantyl diol in the polycondensation reaction, for example, can be used in accordance with certain embodiments to produce polymalonate electrolytes with high glass transition temperatures. Additionally, the acidity and proton conductivity of the resulting polymalonate electrolyte can also be altered by varying the polarity and size of the diols used in the polycondensation reaction.

BRIEF DESCRIPTION OF THE DRAWINGS

FIG. 1 shows a schematic depiction of a proton exchange membrane fuel cell including a membrane-electrode assembly.

DETAILED DESCRIPTION

Embodiments of the present disclosure are described herein. It is to be understood, however, that the disclosed embodiments are merely examples and other embodiments may lake various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of embodiments known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

Due to their high efficiency and high power density in addition to their relative light weight and lack of carbon emissions, proton exchange membrane fuel cells (PEMFCs) are of interest for use in a wide variety of applications. In a membrane-electrode assembly (MEA) of a PEMFC, protons are transferred through a proton exchange membrane (PEM) from an anode to a cathode. PEMs are polymer-based electrolyte materials that exhibit sufficient proton-conduction characteristics. Due to this primary function, PEMs are also referred to as cation exchange membranes and commonly comprise proton-conductive polymer films. In view of their proton-conduction role, the acidity function—like that of carboxylic acid, sulfonic acid, and phenolic acid, for example—is often a key characteristic of PEMs and their associated polymer electrolyte materials. In addition to the ability to efficiently conduct protons, suitable PEMs and their associated polymer electrolyte materials must also exhibit sufficient thermal stability within the PEMFC environment.

Nafion, a sulfonated—and fully fluorinated—ion-conducting polymer based on tetrafluoroethylene, is commonly used in fuel cell PEMs. Nation, however, exhibits relatively poor proton conduction, low thermal stability, high gas permeability, high production costs, and poor environmental compatibility. Accordingly, new ion-conducting polymer materials—and PEMs made therefrom—are of interest to address one or more of these or other drawbacks associated with the use of Nafion in fuel cells. The present disclosure sets forth polymer electrolyte materials based on 1,3-ketone functionality and methods of producing the same. In one or more embodiments, the polymer electrolytes may be generally described as poly(1,3-dicarbonylalkane) materials.

A non-limiting example of a PEMFC that may include the PEMs and associated polymer electrolyte materials disclosed herein is depicted in FIG. 1. A core component of PEMFC 10 is membrane-electrode assembly (MEA) 12, which assists the electrochemical reaction within the stack. MEA 12 includes a PEM through which protons are transferred. As already described, PEMs commonly comprise polymer-based electrolyte materials such as Nafion. In addition to a PEM, MEA 12 also includes other subcomponents such as electrodes and catalysts. Within the MEA 12, protons are transferred from an anode to a cathode through a PEM and its associated polymer electrolyte. The electrodes may be made of any suitable material and may be heat pressed onto the PEM within MEA 12. The anode and cathode electrodes also commonly contain a catalyst layer comprising a platinum-group metal such as platinum or ruthenium. In addition to MEA 12 and its various subcomponents, PEMFC 10 also typically includes other components such as current collectors 14, gas diffusion layer(s) 16, gaskets 18, and at least one bipolar plate (BPP) 20.

In accordance with certain embodiments, polymer electrolyte materials based on 1,3-ketone functionality, which are suitable for use within PEMFCs are disclosed. In one or more embodiments, such polymer electrolytes can be defined by the following general structure (I):

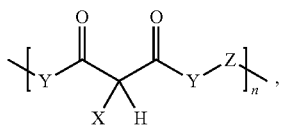

(I)

where X is H, an alkyl group, a polar group, a perfluoro group, an olefinic group, or an ether, Y is O, S, $CH_2$, CHF, $CF_2$, or NR, Z is an alkyl chain, perfluoroalkane, or an ether, and n is an integer ranging from 10 to 1000. In accordance with embodiments in which Y is NR, R may be any hydrocarbyl group such as, but not limited to, an alkyl or aryl group. In accordance with embodiments in which X is an alkyl group, non-limiting examples include a methyl group, an ethyl group, an isopropyl group, a butyl group, and a t-butyl group. In accordance with embodiments in which X is a polar group, non-limiting examples include F, CN, $SO_2$, C(O)Me, C(O)Et, $CO_2Me$, and $CO_2Et$. In accordance with embodiments in which X is a perfluoro group, non-limiting examples include $CF_3$, $CF_2CF_3$, and $CH_2CF_3$. In accordance with embodiments in which X is an olefinic group, non-limiting examples include a vinyl group (—CH═$CH_2$) and an allyl group (—$CH_2$CH═$CH_2$). In accordance with embodiments in which X is an ether, non-limiting examples include a methoxy group (—$OCH_3$), an ethoxy group (—$OCH_2CH_3$), a propoxy group (—$OCH_2CH_2CH_3$), etc.

In accordance with the present disclosure, polymer electrolytes of general structure (I) may include a variety of substituents as X, Y, and Z. In view of the primary, proton-conduction role of PEMs, suitable polymer electrolyte materials in accordance with the present disclosure may be specifically selected based on the acidity function of the polymer. If X is H in a polymer electrolyte of general structure (I), there will be at least two acidic protons per repeat unit. If X is not H, however, there may only be one acidic proton per repeat unit. By modifying the nature of the substituent X, the acidity of the C—H proton between the two carbonyl groups can also be manipulated. In malonates, for example—where Y is O in accordance with the general structure (I)—the pKa of the active proton can be adjusted through the selection of constituent X. As shown in Table I below, when X is changed from methyl, an electron donating group, to $CF_3$, an electron withdrawing group, the acidity of the active proton increases. This is demonstrated in Table 1 by the associated pKa reduction from 18 to 10.8. Accordingly, $CF_3$-substituted malonate is more acidic than acetic acid, which has a pKa of 12.6.

TABLE 1

Comparison of pKa Values for Various Substituted Malonates

| X | pKa |
|---|---|
| H | 15.9 |
| Me ($CH_3$) | 18 |
| Et ($CH_2CH_3$) | 18.5 |
| $CO_2Me$ | 10.8 |
| $CF_3$ | 10.8 |

As shown in Table 2 below, the pKa of the active proton can also be adjusted through the selection of constituent Y within 1,3-dicarbonyl polymers of general structure (I). This is demonstrated by the data shown in Table 2 below where Y is an alkyl group and/or chain rather than O. In a simplified example in which Y is $CH_3$, the pKa values of the active proton within the resultant 1,3-diketone repeat units differ from those shown in Table 1 in connection with substituted malonate repeat units. In accordance with the data shown in Tables 1 and 2, 1,3-diketone-based repeat units are generally more acidic than malonate-based repeat units when comparing structures with the same substituent X. When X is H, for example, Table 2 shows that the resultant 1,3-diketone repeat unit has a pKa of 13.3 while Table 1 shows that the resultant malonate repeat unit has a pKa of 15.9. As also shown in Table 2, when X is changed from methyl, an electron donating group, to an acetyl group, an electron withdrawing group, the acidity of the active proton increases. This is demonstrated by the associated pKa reduction from 15.1 to 8.6 shown in Table 2.

TABLE 2

Comparison of pka Values for Various Substituted 1,3-Diketones

| X | pKa |
|---|---|
| H | 13.3 |
| Me ($CH_3$) | 15.1 |
| Et ($CH_2CH_3$) | 15.3 |
| Ac ($CH_3CO$) | 8.6 |

The pKa values shown in Tables 1 and 2 were calculated by pKa prediction software. The specific software used for the calculation is from ACD Labs, which utilizes a database of more than 17,000 structures and Hammet-type equations for ionizable functional groups to predict accurate pKa values.

In one or more embodiments, polymer electrolytes of general structure (I) may include: H, $CH_3$, $CH_2CH_3$, $CO_2Me$, $CF_3$, or $CH_3CO$ as X; O or an alkyl group as Y; an alkyl chain as Z; and n may range from 10-1000. According to at least one embodiment, polymer electrolytes of general structure (I) includes $CF_3$ as X, $CH_2$ as Y, $C_5H_{10}$ as Z. As described in greater detail below, polymer electrolytes of general structure (I) that include olefinic groups in the polymer side chain—i.e., as X—or in the polymer main chain—i.e., as Y and/or Z—are disclosed in accordance with certain embodiments. In one or more embodiments, both X and Y comprise olefinic groups. In other embodiments, both X and Z comprise olefinic groups. In still other embodiments, both Y and Z comprise olefinic groups. In still yet other embodiments, X, Y, and Z each comprise olefinic groups.

In accordance with certain embodiments, polymer electrolytes defined by general structure (I), shown above, may be used in proton exchange membranes of PEMFCs. PEMs based on the 1,3-dicarbonyl repeat unit polymers described herein may be solid or semi-solid films and may be of various thicknesses. In accordance with at least one embodiment, the thickness of the PEM polymer electrolyte film is between 10 µm and 0.5 mm. In accordance with other embodiments, the thickness of the PEM polymer electrolyte film is between 20 µm and 300 µm. In still other embodiments, the thickness of the PEM polymer electrolyte film is between 50 µm and 200 µm. In still yet other embodiments, the thickness of the PEM polymer electrolyte film is between 100 µm and 150 µm.

Polymer electrolytes defined by general structure (I) and suitable for use as PEMs may characterized by a variety of molecular weights. According to one or more embodiments, suitable polymers may include a molecular weight of between 1,000 g/mol and 1,000,000 g/mol. In other embodiments, the molecular weight of the polymer electrolyte material is between 2,000 and 200,000 g/mol. In still other embodiments, the molecular weight of the polymer electrolyte material is between 5,000 g/mol and 20,000 g/mol.

PEMs based on the 1,3-dicarbonyl repeat unit polymers described herein comprise semi-permeable films having a first proton conductivity in an unstretched configuration and an equal or increased proton conductivity in a stretched configuration. In their unstretched configuration, the polymer electrolyte films disclosed herein have not been physically elongated in any dimension after formation. In their stretched configuration, the polymer electrolyte films disclosed herein have physically elongated in at least one dimension after formation.

There are various suitable methods of producing polymer electrolyte materials defined by general structure (I) for use in proton exchange membranes. An example of such a method involves the polycondensation reaction of a diol with a malonate. In at least one embodiment, the malonate used in the polycondensation reaction is a dimethyl malonate. In another embodiment, the malonate is dimethyl malonate. An example synthesis reaction capable of producing certain polymer electrolyte materials defined by general structure (I) includes the general transesterification reaction (A) shown below:

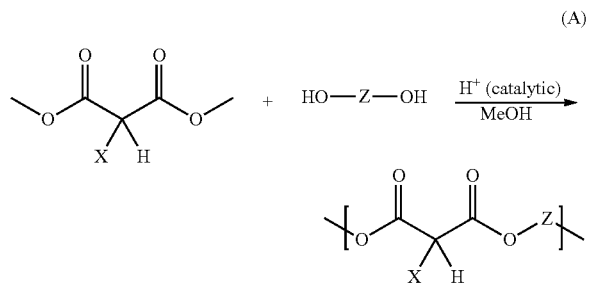

where X is H, an alkyl group, a polar group, a perfluoro group, an olefinic group, or an ether and Z is an alkyl chain, perfluoroalkane, or an ether. In accordance with embodiments in which X is an alkyl group, non-limiting examples include a methyl group, an ethyl group, an isopropyl group, a butyl group, and a t-butyl group. In accordance with embodiments in which X is a polar group, non-limiting examples include F, CN, SO$_2$, C(O)Me, C(O)Et, CO$_2$Me, and CO$_2$Et. In accordance with embodiments in which X is a perfluoro group, non-limiting examples include CF$_3$, CF$_2$CF$_3$, and CH$_2$CF$_3$. In accordance with embodiments in which X is an olefinic group, non-limiting examples include a vinyl group (—CH=CH$_2$) and an allyl group (—CH$_2$CH=CR$_2$). In accordance with embodiments in which X is an ether, non-limiting examples include a methoxy group (—OCH$_3$), an ethoxy group (—OCH$_2$CH$_3$), a propoxy group (—OCH$_2$CH$_2$CH$_3$), etc. In the example transesterification reaction (A) shown above, polymalonates—where Y is O in accordance with general structure (I)—are synthesized from dimethyl malonate and diol in the presence of methanol and an acid catalyst.

In one example, poly-[pentyl fluoromalonate] was synthesized as follows. A solution of titanium(IV) isopropoxide (0.07 mL, 0.23 mmol) was added to a solution of diethyl fluoromalonate (4,2 g, 23.4 mmol) and 1,5-pentane diol (2.4 g, 23.4 mmol) in THF (10 mL) in an argon atmosphere, and the mixture was stirred at 120° C. for 2 hours. While maintaining the same temperature, the reaction flask was exposed to high vacuum intermittently for 5 hours to remove emerging ethanol from the reaction mixture. Again, at the same temperature, the partially polymerized mixture in the reaction flask was exposed to constant high vacuum for 24 hours. The viscous polymerized mixture was then dissolved in dichloromethane and dropwise added into a large volume (100 mL) of stirred methanol to poly-[pentyl fluoromalonate] (yield 4.7 g, 85%).

In accordance with the general transesterification reaction (A) shown above, the size and nature of the diol can be varied to control the physical, thermal, and mechanical properties of the resulting polymer electrolyte. The incorporation of a bulky diol such as an adamantyl diol in the polycondensation reaction, for example, can be used in accordance with certain embodiments to produce polymalonate electrolytes with high glass transition temperatures. Additionally, the acidity and proton conductivity of the resulting polymalonate electrolyte can also be altered by varying the polarity and size of the diols used in the polycondensation reaction. For example, a longer diol will result in a polymer with reduced density of acid functionalities and thus lower proton conductivity.

By incorporating olefinic groups in polymer electrolytes of general structure (I), the polymers can be crosslinked using radical or thiol-ene chemistry. In accordance with embodiments of the present disclosure, olefinic groups may be included in general structure (I) polymers in either the side chain—i.e., as X—or in the polymer main chain—i.e., as Y and/or Z. In some embodiments, an olefinic group is included in either the side chain or the main chain of polymer electrolytes of general structure (I), but not in both. In other embodiments, an olefinic group is included in both the side chain and the main chain of polymer electrolytes of general structure (I). In at least one embodiment, substituents X, Y, and Z each comprise an olefinic group. For example, when an olefinic group such as an allyl group (—CH$_2$CH=CH$_2$) is X and O is Y in a polymer electrolyte of general structure (I), a polymer electrolyte of general structure (II) can be defined as follows:

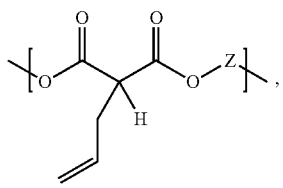

where Z is an alkyl chain, perfluoroalkane or an ether. Alternatively, such olefin-containing polymer electrolyte materials may include an olefinic group as substituent X of any type where the number of carbon atoms ranges from 2 to 10. Similarly, for example, when an olefinic group such as —CH$_2$CH=CHCH$_2$ is Z and O is Y in a polymer electrolyte of general structure (I), a polymer electrolyte of general structure (III) can be defined as follows:

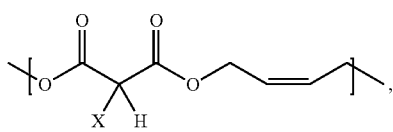

where X is H, an alkyl group, a polar group, a perfluoro group, an olefinic group, or an ether. In accordance with embodiments in which X is an alkyl group, non-limiting examples include a methyl group, an ethyl group, an isopropyl group, a butyl group, and a t-butyl group. In accordance with embodiments in which X is a polar group, non-limiting examples include F, CN, SO$_2$, C(O)Me, C(O)Et, CO$_2$Me, and CO$_2$Et. In accordance with embodiments in which X is a perfluoro group, non-limiting examples include CF$_3$, CF$_2$CF$_3$, and CH$_2$CF$_3$. In accordance with embodiments in which X is an olefinic group, non-limiting examples include a vinyl group (—CH=CH$_2$) and an allyl group (—CH$_2$CH=CH$_2$). In accordance with embodiments in which X is an ether, non-limiting examples include a methoxy group (—OCH$_3$), an ethoxy group (—OCH$_2$CH$_3$), a propoxy group (—OCH$_2$CH$_2$CH$_3$), etc. Alternatively, such olefin-containing polymer electrolyte materials may include an olefinic group as substituent Z of any type where the number of carbon atoms ranges from 2 to 10.

Polymer electrolytes defined by general structures (II) and (III), shown above, may be used in proton exchange membranes of PEMFCs in accordance with one or more embodiments. Such polymer electrolytes may be crosslinked or non-crosslinked and may form a film of various thicknesses. In accordance with at least one embodiment, the thickness of the PEM polymer electrolyte film is between 10 μm and 0.5 mm. In accordance with other embodiments, the thickness of the PEM polymer electrolyte film is between 20 μm and 300 μm. In still other embodiments, the thickness of the PEM polymer electrolyte film is between 50 μm and 200 μm. In still yet other embodiments, the thickness of the PEM polymer electrolyte film is between 100 μm and 150 μm.

Olefin-containing polymer electrolyte materials, such as those defined by general structures (II) and (III), can be crosslinked using radical or thiol-ene chemistry. For radical-induced crosslinking, a small amount of radical initiator such as AIBN or peroxide can be added to the dicarbonyl polymer thin film in order to form the crosslinked polymer. For thiol-ene type crosslinking, a small amount of tri-thiol or di-thiol can be used in the reaction.

In accordance with certain embodiments, the dicarbonyl polymer electrolyte materials disclosed herein—such as those defined by general structures (I), (II), (III)—may be used to form crosslinked and non-crosslinked block copolymers for use as PEMs. In such configurations, the proton-conducting block of the block copolymer may comprise one or more of the dicarbonyl polymer electrolyte materials disclosed herein. The mechanical block of the copolymer may comprise, for example, polystyrene, polyphenyl ether (PPE), or any other suitable material. In such embodiments, the block copolymers can be crosslinked at either the mechanical block or at the conducting block. A non-limiting example of a block copolymer comprising a dicarbonyl polymer electrolyte disclosed herein as the conductive block—in this example, poly(1,3-nonyldiketone)—and styrene as the mechanical block can be defined by the following structure (IV):

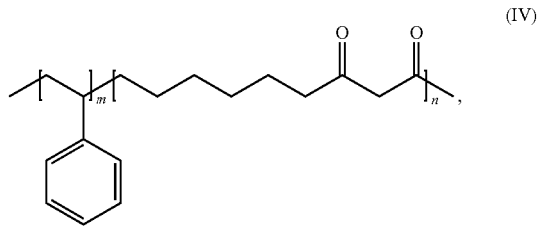

where m is an integer ranging from 1 to 10,000 and n is an integer ranging from 10 to 1000. While the polymer electrolyte material of structure (IV) is based on poly(1,3-nonyldiketone), it is understood that any of the polymer electrolytes defined by general structures (I), (II), or (III) may be used in accordance with certain embodiments.

Block copolymer electrolytes suitable for use as proton exchange membrane of PEMFCs include at least a first block containing a dicarbonyl polymer defined by general structure (I) and a second block that contains a polymer that has a tensile modulus in excess of $1\times10^4$ Pa at temperatures at and below 150° C. In some embodiments, the second polymer block may have a modulus of between $10^4$ and $10^9$ Pa at temperatures at and below 150° C. In other embodiments, the second polymer block may have a modulus of between $10^5$ and $10^8$ Pa at temperatures at and below 150° C. Non-limiting examples of polymers included in the second block include polystyrene, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide) (PXE), polyolefins, poly(t-butyl vinyl ether), poly(cyclohexyl methacrylate), poly(cyclohexyl vinyl ether), polyethylene, fluorocarbons, polyvinylidene fluoride, and copolymers that contain styrene, methacrylate, anchor vinylpyridine. In some arrangements, the first block—which contains the dicarbonyl polymer—forms a proton-conductive phase of the block copolymer and the second block forms a structural phase of the block copolymer. In addition to such diblock configurations, the block copolymers disclosed herein may be triblock copolymer electrolytes. In triblock configurations containing first and second blocks described above, the third block may contain either another dicarbonyl polymer defined by general structure (I) or a mechanical polymer and thereby form either a proton-conductive phase or a structural phase within the block copolymer.

The sizes or widths of the conductive and structural phases can be adjusted by adjusting the molecular weights of each of the polymer blocks. In accordance with at least one embodiment, the characteristic size of the phases is between 5 nm and 1000 nm. In accordance with other embodiments, the characteristic size of the phases is between 10 nm and 500 mm. In still other embodiments, the characteristic size of the phases is between 10 nm and 200 nm. In still yet other embodiments, the characteristic size of the phases is between 15 inn and 100 nm. In various embodiments, the phases can be lamellar, cylindrical, spherical, or gyroidal depending on the nature of the polymer blocks and their ratios in the block copolymer. In diblock and triblock configurations, the blocks may be all covalently bonded together.

In some diblock arrangements, both the first block and the second block are linear polymer blocks. In other diblock arrangements, either one or both blocks have a comb (or branched) structure. In one diblock arrangement, neither block is crosslinked. In another diblock arrangement, one block is crosslinked. In yet another diblock arrangement, both blocks are crosslinked.

In some triblock arrangements, the first block, the second block, and the third block are each linear polymer blocks. In other triblock arrangements, one or more of the blocks has a comb (or branched) structure. In one triblock arrangement, none of the blocks is crosslinked. In another triblock arrangement, one block is crosslinked. In yet another triblock arrangement, two blocks are crosslinked. In still yet another triblock arrangement, all three blocks are crosslinked.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A polymer electrolyte material for a proton exchange membrane, the polymer electrolyte material comprising:
a polymer structure described by:

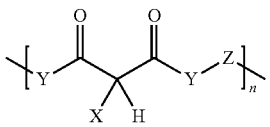

where
X is H, an alkyl group, a polar group, a perfluoro group, an olefinic group, or an ether;
Y is O, S, $CH_2$, CHF, $CF_2$, or NR;
Z is an alkyl chain, perfluoroalkane, or an ether; and
n is an integer ranging from 10 to 1000.

2. The polymer electrolyte material of claim 1, wherein X is H, $CF_3$, an alkyl group, or an olefinic group.

3. The polymer electrolyte material of claim 1, wherein Y is O or $CH_2$ and Z is $C_5H_{10}$.

4. The polymer electrolyte material of claim 1, wherein the polymer electrolyte material is crosslinked.

5. The polymer electrolyte material of claim 1, wherein the polymer electrolyte material has a weight average molecular weight of between 1,000 g/mol and 1,000,000 g/mol.

6. A proton exchange membrane for a proton exchange membrane fuel cell, comprising:
a proton-conducting polymer having a polymer structure described by:

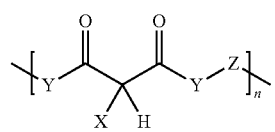

where
X is H, an alkyl group, a polar group, a perfluoro group, an olefinic group, or an ether;
Y is O, S, $CH_2$, CHF, $CF_2$, or NR;
Z is an alkyl chain, perfluoroalkane, or an ether;
n is an integer ranging from 10 to 1000; and
wherein the proton-conducting polymer has a thickness of between 10 μm and 0.5 mm.

7. The proton exchange membrane of claim 6, wherein the thickness of the proton-conducting polymer is between 20 μm and 300 μm.

8. The proton exchange membrane of claim 6, wherein the proton-conducting polymer forms a first polymer block of a block copolymer material and the proton exchange membrane further comprises a second polymer block in the block copolymer material.

9. The proton exchange membrane of claim 8, wherein the second polymer block has a modulus of between $10^4$ and $10^9$ Pa.

10. The proton exchange membrane of claim 8, wherein the first and second polymer are linear polymer blocks.

11. The proton exchange membrane of claim 8, wherein the second polymer block includes polystyrene or polyphenyl ether.

12. The proton exchange membrane of claim 8, wherein the block copolymer material is crosslinked at the first polymer block.

13. The proton exchange membrane of claim 8, wherein the block copolymer material has a thickness of between 10 μm and 0.5 mm.

14. The proton exchange membrane of claim 8, further comprising a third polymer block in the block copolymer material.

15. The proton exchange membrane of claim 14, wherein the third polymer block includes a proton-conducting polymer having a polymer structure described by:

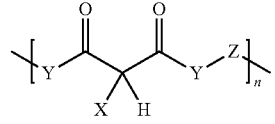

where
X is H, an alkyl group, a polar group, a perfluoro group, an olefinic group, or an ether;
Y is O, S, $CH_2$, CHF, $CF_2$, or NR; and
Z is an alkyl chain, perfluoroalkane, or an ether.

16. A method of forming the polymer electrolyte material of claim 1, the method comprising:
mixing a dimethyl malonate with a diol to form a first mixture containing a polymer having a polymer structure described by:

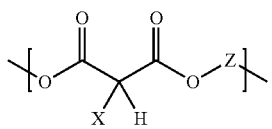

where
X is H, an alkyl group, a polar group, a perfluoro group, an olefinic group, or an ether; and
Z is an alkyl chain, perfluoroalkane, or an ether.

17. The method of claim 16, wherein dimethyl malonate has a structure described by:

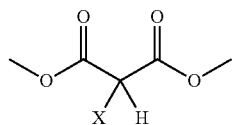

where X is H, an alkyl group, a polar group, a perfluoro group, an olefinic group, or an ether.

18. The method of claim 16, wherein the diol has a structure described by:

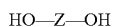

where Z is an alkyl chain, perfluoroalkane, or an ether.

19. The method of claim 16, wherein the method further comprises stirring the first mixture for between 1 and 5 hours at a temperature of between 90° C. and 140° C.

20. The method of claim 16, wherein the method further comprises exposing the first mixture to vacuum at a temperature of between 90° C. and 140° C.

* * * * *